United States Patent
Kawamura et al.

(10) Patent No.: US 11,345,295 B2
(45) Date of Patent: May 31, 2022

(54) IMPACT ABSORBING STRUCTURE FOR VEHICLES

(71) Applicant: MAZDA MOTOR CORPORATION, Hiroshima (JP)

(72) Inventors: Chikara Kawamura, Aki-gun (JP);
Tsuyoshi Nishihara, Aki-gun (JP);
Kazutaka Ishikura, Aki-gun (JP);
Hiroaki Takeshita, Aki-gun (JP);
Tsuneki Shimanaka, Aki-gun (JP);
Taiki Yotsuyanagi, Aki-gun (JP);
Yoshiaki Murakami, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 60 days.

(21) Appl. No.: 16/770,933

(22) PCT Filed: Dec. 11, 2018

(86) PCT No.: PCT/JP2018/045392
§ 371 (c)(1),
(2) Date: Jun. 8, 2020

(87) PCT Pub. No.: WO2019/117111
PCT Pub. Date: Jun. 20, 2019

(65) Prior Publication Data
US 2021/0162939 A1     Jun. 3, 2021

(30) Foreign Application Priority Data

Dec. 14, 2017     (JP) .............................. JP2017-239880

(51) Int. Cl.
*B60R 19/18*     (2006.01)
*B60R 19/30*     (2006.01)

(52) U.S. Cl.
CPC .............. *B60R 19/18* (2013.01); *B60R 19/30* (2013.01); *B60R 2019/1853* (2013.01); *B60R 2019/1886* (2013.01)

(58) Field of Classification Search
CPC . B60R 19/18; B60R 19/30; B60R 2019/1853; B60R 2019/1886; B60R 19/24; B60R 19/34
See application file for complete search history.

(56) References Cited

U.S. PATENT DOCUMENTS

| 9,415,735 B1 | 8/2016 | Baccouche et al. |
| 2010/0127531 A1 | 5/2010 | Yasuhara et al. |

(Continued)

FOREIGN PATENT DOCUMENTS

| JP | 2007-015626 A | 1/2007 |
| JP | 2008-221987 A | 9/2008 |

(Continued)

OTHER PUBLICATIONS

The extended European search report issued by the European Patent Office dated Sep. 30, 2020, which corresponds to European Patent Application No. 18888603.0-1132 and is related to U.S. Appl. No. 16/770,933.

(Continued)

*Primary Examiner* — D Glenn Dayoan
*Assistant Examiner* — Melissa Ann Bonifazi
(74) *Attorney, Agent, or Firm* — Studebaker & Brackett PC

(57) ABSTRACT

An impact absorbing structure for a vehicle according to the present invention includes: a resin frame member extending in a vehicle front-rear direction and having an opening portion in a surface thereof on one side in a vehicle width direction; and a strut member disposed in the opening portion of the frame member. The frame member includes a (Continued)

frame body having the opening portion, and a rib protruding at least either upward or downward from the frame body and extending in the vehicle front-rear direction. The strut member is disposed between a pair of opening edges for defining an upper edge and a lower edge of the opening portion and at a position abuttable against the paired opening edges, when the frame member is deformed by input of a load at a time of oblique collision from upward or oblique collision from downward.

9 Claims, 4 Drawing Sheets

(56) References Cited

U.S. PATENT DOCUMENTS

| | | |
|---|---|---|
| 2015/0191203 A1 | 7/2015 | Okamoto |
| 2016/0325701 A1 | 11/2016 | Yabu et al. |
| 2017/0021868 A1 | 1/2017 | Watanabe et al. |

FOREIGN PATENT DOCUMENTS

| | | |
|---|---|---|
| JP | 2009-234377 A | 10/2009 |
| JP | 2009-274663 A | 11/2009 |
| JP | 2017-024552 A | 2/2017 |
| JP | 2017-094850 A | 6/2017 |

OTHER PUBLICATIONS

International Search Report issued in PCT/JP2018/045392; dated Feb. 12, 2019.
An Office Action; "Notice of Reasons for Refusal," issued by the Japanese Patent Office dated Feb. 5, 2019, which corresponds to Japanese Patent Application No. 2017-239880.

IMPACT ABSORBING STRUCTURE FOR VEHICLES

TECHNICAL FIELD

The present invention relates to an impact absorbing structure for a vehicle including a frame member formed of a resin material.

BACKGROUND ART

Conventionally, there is known an impact absorbing structure for absorbing an impact applied to a front portion or a rear portion of a vehicle at a time of collision by using a compression-deformable buffer member (hereinafter, also referred to as a crash can). The crash can is mounted between a bumper reinforcement extending in a vehicle width direction along a front end surface or a rear end surface of the vehicle, and distal ends of a pair of left and right side frames extending from a passenger compartment side toward the bumper reinforcement.

Generally, the crash can is formed of a metal material. By compressing and destroying the crash can in an axis direction at a time of vehicle collision, impact energy transmitted to a passenger compartment is absorbed.

Since the crash can is a relatively large component, an influence of the metal crash can on a weight of a vehicle body is non-negligible. In view of the above, as described in Patent Literature 1, forming a crash can (crash box) of a resin material such as CFRP has also been performed to reduce the weight of a vehicle body.

Further, it is desirable to standardize the crash can formed of resin such as CFRP regardless of a difference in vehicle type in an aspect of lowering a ratio of cost of a mold.

On the other hand, the height of a bumper reinforcement with respect to a colliding object differs depending on a vehicle type. Therefore, a colliding object may collide against a bumper reinforcement from an oblique direction inclined upward or downward with respect to a longitudinal direction (axis direction) of the crash can depending on a vehicle type.

Specifically, in a vehicle of a type in which a vehicle height is low such as a sports type vehicle, the height of a bumper reinforcement is low with respect to a colliding object. Therefore, the colliding object collides against the bumper reinforcement obliquely from upward. On the other hand, in a vehicle of a type in which a vehicle height is high such as an SUV, the height of a bumper reinforcement is high with respect to a colliding object. Therefore, the colliding object collides against the bumper reinforcement obliquely from downward.

When oblique collision from upward or oblique collision from downward as described above occurs, an impact load directing obliquely downward or obliquely upward is input to the crash can via the bumper reinforcement. Thus, a bending stress acting to bend the crash can upward or downward may be applied to an intermediate portion of the crash can in a longitudinal direction thereof (vehicle front-rear direction), and the crash can may be bent. When the crash can is bent, the crash can is not appropriately compressed and destroyed in the axis direction, and a sufficient impact absorbing effect may not be obtained.

The configuration of Patent Literature 1 mentions a measure of suppressing bending deformation, which occurs due to a bending stress acting on a base end (connecting portion to a side frame) of the crash can at a time of oblique collision from upward or oblique collision from downward. However, Patent Literature 1 does not mention bending deformation of an intermediate portion between the base end and a distal end (connecting portion to a bumper reinforcement) of the crash can. Thus, there is room for further investigation.

CITATION LIST

Patent Literature

Patent Literature 1: Japanese Unexamined Patent Application Publication No. 2009-274663

SUMMARY OF INVENTION

In view of the above-described circumstances, an object of the present invention is to provide an impact absorbing structure for a vehicle, which enables to, with use of a resin frame member as a buffer member (crash can), suppress bending of an intermediate portion of the frame member in a front-rear direction due to a bending stress acting at a time of oblique collision from upward or oblique collision from downward.

As a means for solving the above issue, an impact absorbing structure for a vehicle according to the present invention includes: a resin frame member extending in a vehicle front-rear direction and including an opening portion in a surface thereof on one side in a vehicle width direction; and a strut member disposed in the opening portion of the frame member. The frame member includes a frame body having the opening portion, and a rib protruding at least either upward or downward from the frame body and extending in the vehicle front-rear direction. The strut member is disposed between a pair of opening edges for defining an upper edge and a lower edge of the opening portion, and at a position abuttable against the paired opening edges, when the frame member is deformed by input of a load at a time of oblique collision from upward or oblique collision from downward.

DESCRIPTION OF EMBODIMENTS

Figure 1:
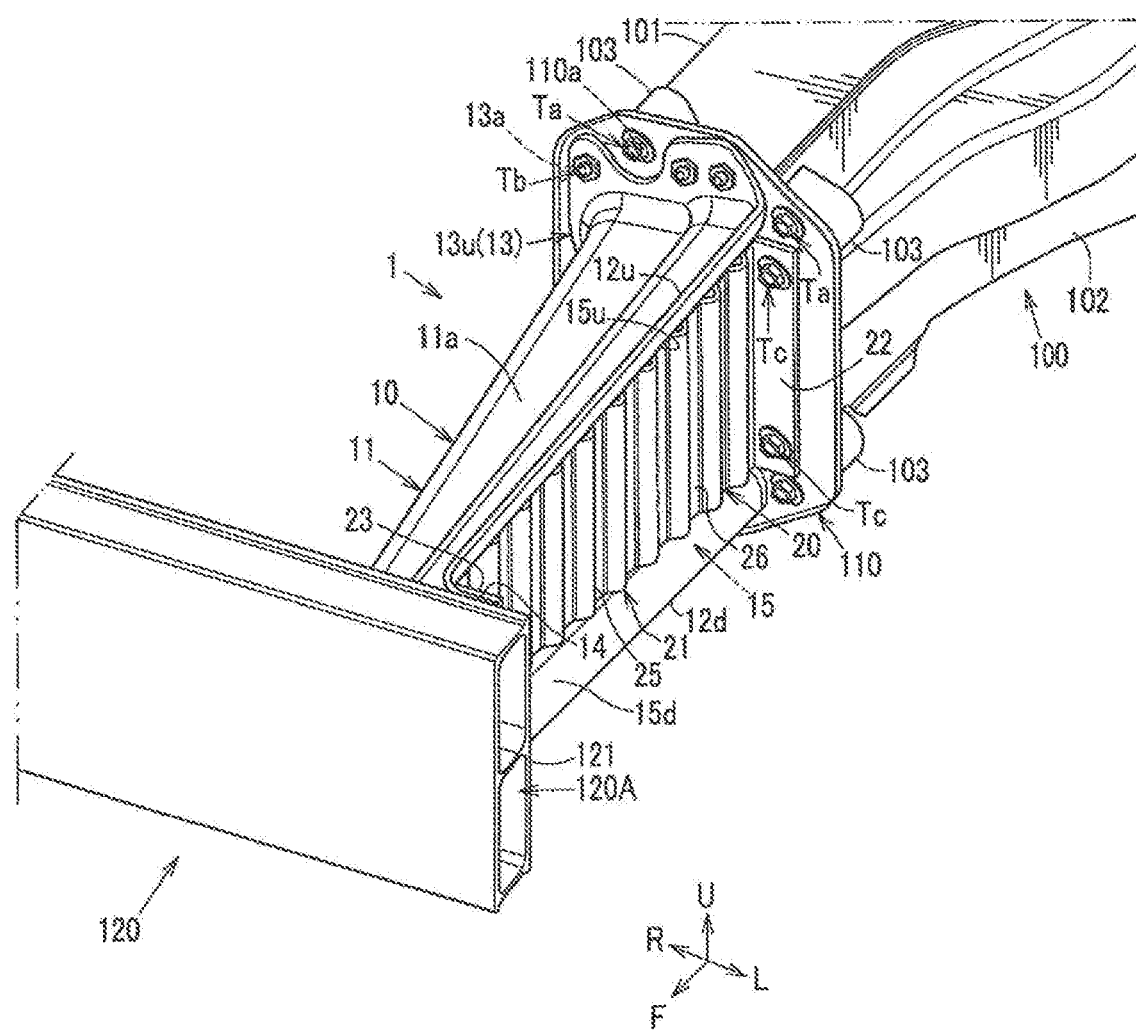
FIG. 1 is a diagram illustrating an embodiment in which an impact absorbing structure according to the present invention is applied to a vehicle front portion, and is a perspective view illustrating essential parts including a crash can.

In the following, an embodiment according to the present invention is described in detail with reference to the drawings.

FIGS. 1 to 4 illustrate a preferred embodiment in a case where an impact absorbing structure according to the present invention is applied to a vehicle front portion. In the drawings, the arrow F indicates a vehicle front side, the arrow L indicates a vehicle left side, the arrow R indicates a vehicle right side, and the arrow U indicates a vehicle upper side. Since essential parts of a vehicle front portion according to the present embodiment are symmetrical in a left-right direction, in the following, only a configuration on the vehicle left side is described, unless otherwise specifically mentioned. In this case, the vehicle left side corresponds to an outer side in a vehicle width direction, and the vehicle right side corresponds to an inner side in the vehicle width direction.

Figure 2:
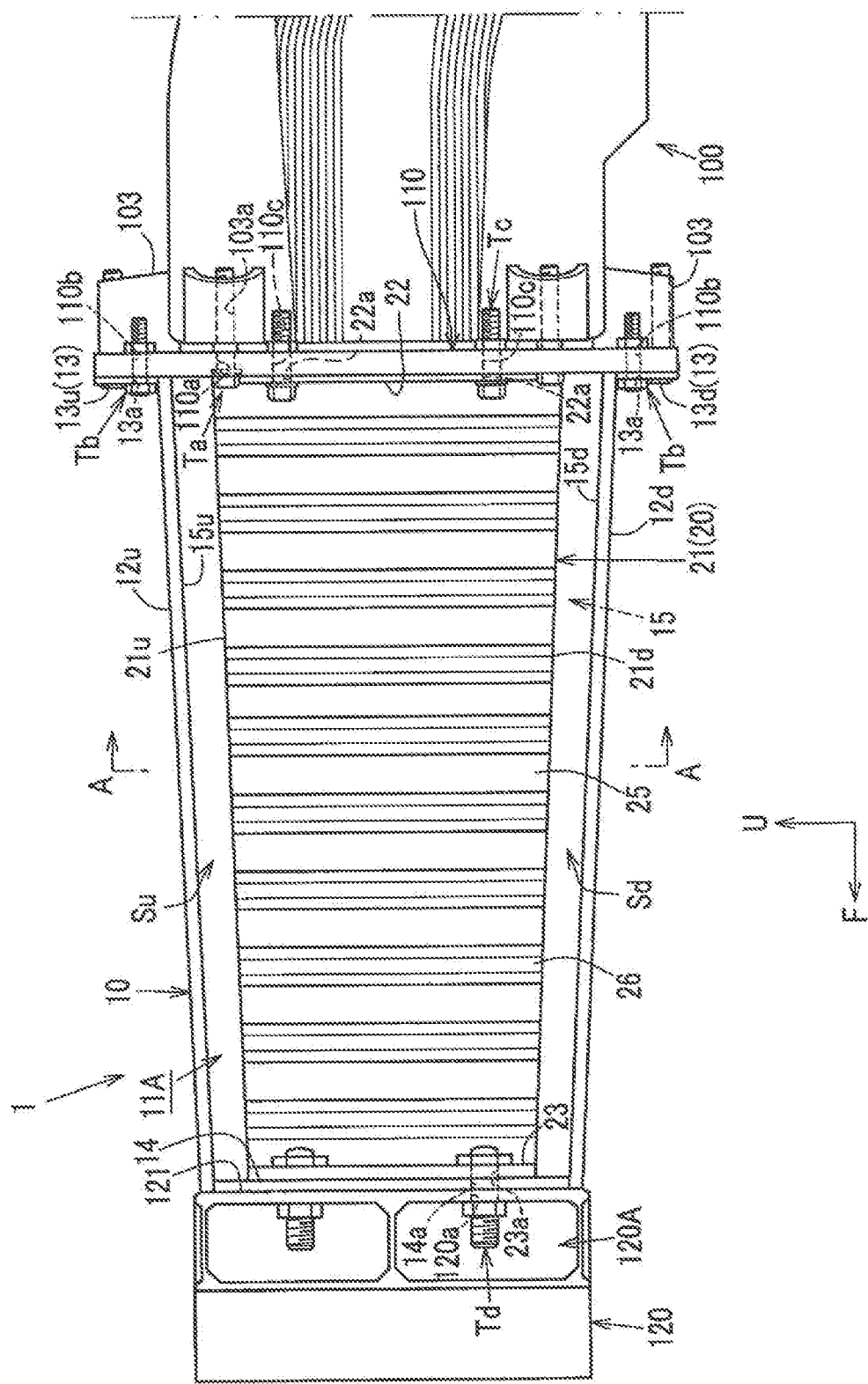
FIG. 2 is a right side view illustrating essential parts of the vehicle front portion.
Figure 3:
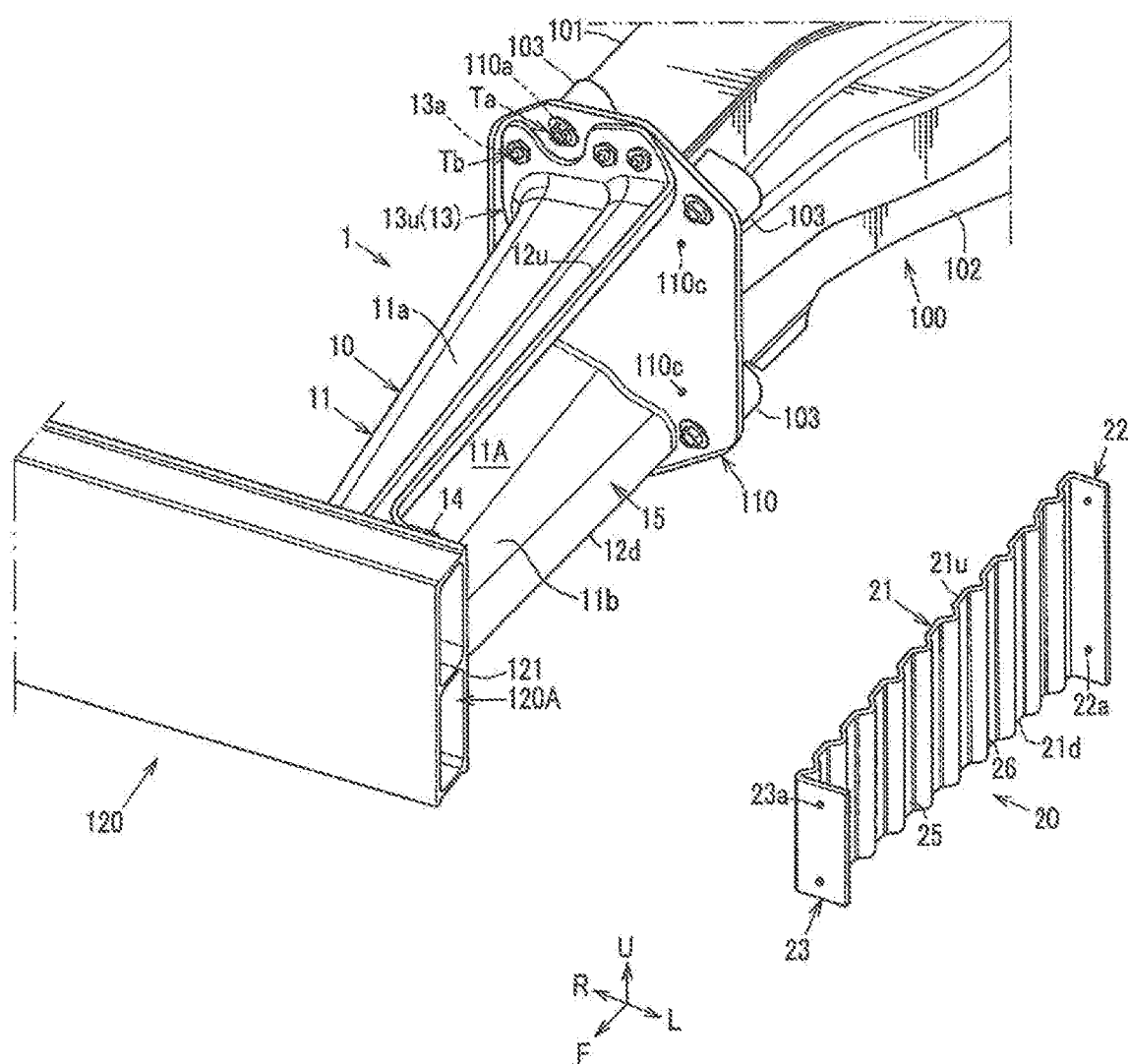
FIG. 3 is an exploded perspective view in which a strut member is removed from the state of FIG. 1.

As illustrated in FIGS. 1 to 3, the vehicle front portion includes a pair of left and right front side frames 100 extending in the front-rear direction on left and right sides of an engine room, a pair of left and right crash cans 1 disposed in front of the front side frames 100, and a pair of left and right mounting plates 110 disposed between the front side frames 100 and the crash cans 1. The mounting plate 110 is fixedly fastened to a front end of the front side frame 100, and the crash can 1 is fixedly fastened to a front surface of the mounting plate 110. The crash can 1 is formed of carbon fiber reinforced resin (hereinafter, abbreviated as "CFRP").

A bumper reinforcement 120 extending in the vehicle width direction is formed on a front end of the vehicle. The bumper reinforcement 120 is mounted to connect front ends of the paired left and right crash cans 1 to each other.

As illustrated in FIG. 1, the front side frame 100 is a vehicle body strength member including a closed cross section extending in a vehicle front-rear direction. The front side frame 100 includes a front side frame inner panel 101, and a front side frame outer panel 102 connected to the front side frame inner panel 101 from the outer side in the vehicle width direction. The front side frame inner panel 101 and the front side frame outer panel 102 include a pair of upper and lower flanges for connecting the two panels 101 and 102.

As illustrated in FIGS. 1 and 2, bolt mounting portions 103 are formed on four corner portions (an upper portion and a lower portion of each of left and right side portions) at a front end of the front side frame 100. The bolt mounting portions 103 are formed to radially bulge from the corner portions of the front end of the front side frame 100. As illustrated in FIG. 2, a mounting hole 103a passing through in the vehicle front-rear direction is formed in each of the bolt mounting portions 103. Illustration of the bolt mounting portions 103 on the inner side in the vehicle width direction and on the lower side is omitted.

As illustrated in FIG. 2, the mounting plate 110 includes a plurality of (four) mounting holes 110a (FIG. 2) passing through in the vehicle front-rear direction at positions corresponding to the mounting holes 103a of the bolt mounting portions 103 in a front view.

The mounting plate 110 is connected to a front end of the front side frame 100 by using a fastening member Ta including a bolt and a nut. Specifically, the mounting plate 110 is abutted against a front end of the front side frame 100, and in this state, a bolt is received in the mounting hole 110a of the mounting plate 110 and in the mounting hole 103a of the front side frame 100, and a nut is screwed with the bolt. Thus, the mounting plate 110 is connected to a front end of the front side frame 100 (see FIGS. 1 and 2).

As illustrated in FIGS. 1 and 2, the bumper reinforcement 120 is a member for applying a predetermined strength to an unillustrated bumper. Both ends of the bumper reinforcement 120 in the vehicle width direction are respectively connected to the front side frames 100 via the crash cans 1. The bumper reinforcement 120 extends in the vehicle width direction while being moderately curved to protrude forward. A closed cross sectional space 120A is formed inside the bumper reinforcement 120.

As illustrated in FIGS. 1 to 4, the crash can 1 includes a frame member 10 and a strut member 20. The frame member 10 and the strut member 20 are constituted of a one-piece mold of CFRP.

The frame member 10 is a substantially hat-shaped member in a cross sectional view, which extends in the vehicle front-rear direction, and has a cross section orthogonal to the vehicle front-rear direction opened to the outer side in the vehicle width direction, and includes an opening portion 15 in a surface thereof on the outer side in the vehicle width direction.

The strut member 20 is a member similar to a flat plate extending in the vehicle front-rear direction along a plane orthogonal to the vehicle width direction, and is disposed at a position corresponding to the opening portion 15 of the frame member 10, specifically, between a pair of opening edges 15u and 15d for defining an upper edge and a lower edge of the opening portion 15. The strut member 20 is a member for interfering and supporting the paired opening edges 15u and 15d of the frame member 10. When an upward or downward bending stress acts on the frame member 10, the strut member 20 plays a role of suppressing the frame member 10 from being deformed to narrow the opening portion 15 (in other words, move the upper and lower opening edges 15u and 15d toward each other).

As illustrated in FIGS. 1 to 3, the frame member 10 integrally includes a frame body 11, an upper rib 12u, a lower rib 12d, a base-end-side flange 13 (13u, 13d), and a distal-end-side flange 14.

Figure 4:
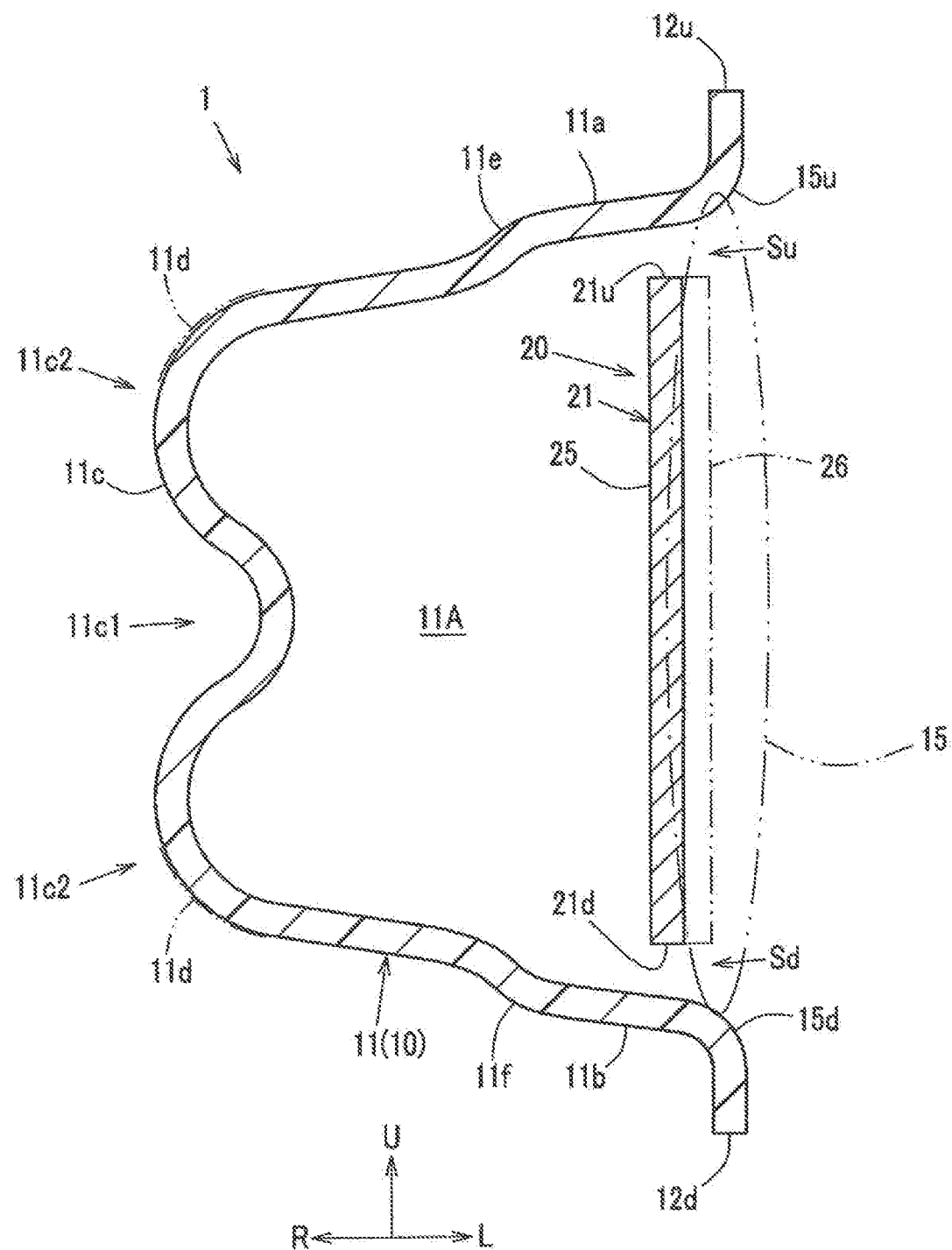
FIG. 4 is an enlarged cross-sectional view taken along the line A-A in FIG. 2.

As mainly illustrated in FIG. 4, the frame body 11 includes an upper wall 11a, a lower wall 11b, and a lateral wall 11c for connecting inner ends of the upper and lower walls 11a and 11b in the vehicle width direction to each other. In other words, the frame body 11 has, over the entire length thereof in the vehicle front-rear direction, an opened cross sectional space 11A surrounded by the three walls 11a, 11b, and 11c and opened to the outer side in the vehicle width direction, in other words, the opened cross sectional space 11A having the opening portion 15 in a surface thereof on the outer side in the vehicle width direction (see FIGS. 2 to 4). Further, as illustrated in FIGS. 1 to 3, the frame body 11 is formed into a tapered shape such that a size of a cross section orthogonal to the vehicle front-rear direction gradually decreases toward the vehicle front side.

As illustrated in FIG. 4, a recess portion 11c1 recessed toward aside where the opening portion 15 is formed (toward the outer side in the vehicle width direction) is formed in an intermediate portion, in an up-down direction, of the lateral wall 11c on the inner side in the vehicle width direction to extend over the entire length of the lateral wall 11c in the vehicle front-rear direction. Bulging portions 11c2 and 11c2 bulging toward aside (toward the inner side in the vehicle width direction) opposite to the opening portion 15 are formed on an upper side and a lower side of the recess portion 11c1. The recess portion 11c, and the bulging portions 11c2 and 11c2 are formed to be smoothly continued to one another.

A curved portion 11d is formed on a corner portion where the upper wall 11a and the lateral wall 11c intersect with each other, and on a corner portion where the lower wall 11b and the lateral wall 11c intersect with each other. The curved portion 11d is curved to form a part of the upper and lower bulging portions 11c2 of the lateral wall 11c.

An upper wall curved portion 11e is formed on an intermediate portion of the upper wall 11a in the vehicle width direction. Specifically, the upper wall 11a is formed in such a way that an area on the outer side in the vehicle width direction (an area close to the upper rib 12u) is higher than an area on the inner side in the vehicle width direction with respect to the upper wall curved portion 11e.

Likewise, a lower wall curved portion 11f is formed on an intermediate portion of the lower wall 11b in the vehicle width direction. Specifically, the lower wall 11b is formed in such a way that an area on the outer side in the vehicle width direction (an area close to the lower rib 12d) is lower than an area on the inner side in the vehicle width direction with respect to the lower wall curved portion 11f.

As illustrated in FIG. 4, the upper rib 12u is formed to protrude upward from the upper opening edge 15u of the fame body 11. The lower rib 12d is formed to protrude downward from the lower opening edge 15d of the frame body 11.

Each of the upper rib 12u and the lower rib 12d is formed substantially over the entire length of the frame body 1 in the vehicle front-rear direction (longitudinal direction). The upper rib 12u and the lower rib 12d play a role of enhancing rigidity against an upward or downward bending stress acting on the crash can 1. This contributes to suppressing bending of an intermediate portion of the crash can 1, when collision (hereinafter, referred to as "oblique collision from upward or oblique collision from downward") occurs in which an input direction of a collision load input from the vehicle front side is inclined upward or downward with respect to the vehicle front-rear direction (longitudinal direction of the crash can 1).

As illustrated in FIGS. 1 to 3, the base-end-side flange 13 includes an upper base-end-side flange 13u protruding upward from an upper edge of a base end (rear end) of the frame body 11, and a lower base-end-side flange 13d (FIG. 2) protruding downward from a lower edge of the base end (rear end) of the frame body 11.

Each of the upper and lower base-end-side flanges 13u and 13d includes a plurality of mounting hole 13a passing through in the vehicle front-rear direction. On the other hand, as illustrated in FIG. 2, the mounting plate 110 includes a plurality of mounting holes 110b passing through in the front-rear direction at positions corresponding to the mounting holes 13a of the base-end-side flanges 13u and 13d in a front view (view in the vehicle front-rear direction).

The frame member 10 is connected to the mounting plate 110 by using a fastening member Tb including a bolt and a nut. Specifically, the base-end-side flange 13 (the upper base-end-side flange 13u and the lower base-end-side flange 13d) of the frame member 10 is abutted against a front surface of the mounting plate 110, and in this state, a bolt is received in the mounting hole 13a of the base-end-side flange 13 and in the mounting hole 110b of the mounting plate 110, and a nut is screwed with the bolt. Thus, a base end (rear end) of the frame member 10 is connected to the mounting plate 110. In other words, a base end of the frame member 10 is connected to a front end of the front side frame 100 via the mounting plate 110.

Since a connection structure as described above increases a connection strength between a base end (rear end) of the frame member 10 and the front side frame 100, this contributes to suppressing bending of the base end of the frame member 10 at a time of oblique collision from upward or oblique collision from downward. Specifically, when oblique collision from upward or oblique collision from downward occurs, a bending stress acting on the frame member 10 is maximum at a base end of the frame member 10. Since the above-described connection structure reinforces a base end of the frame member 10 on which a maximum bending stress acts as described above, the connection structure is advantageous in suppressing bending deformation of the base end.

As illustrated in FIGS. 2 and 3, the mounting plate 110 includes a pair of upper and lower mounting holes 110c passing through in the vehicle front-rear direction at a position close to the outer side in the vehicle width direction. The paired mounting holes 110c are holes for connecting a base-end-side flange 22 of the strut member 20 to be described later, and are formed between a pair of mounting holes 110a close to the outer side in the vehicle width direction among the four mounting holes 110a formed in four corners of the mounting plate 110.

As illustrated in FIGS. 1 to 3, the distal-end-side flange 14 is formed to extend toward the outer side in the vehicle width direction from a distal end (front end) of the frame body 11.

As illustrated in FIG. 2, the distal-end-side flange 14 includes a pair of upper and lower mounting holes 14a passing through in the vehicle front-rear direction. On the other hand, a rear wall 121 of the bumper reinforcement 120 includes a plurality of (two) mounting holes 120a passing through in the vehicle front-rear direction at positions corresponding to the mounting holes 14a of the distal-end-side flange 14 in a front view (view in the vehicle front-rear direction).

As illustrated in FIGS. 1 to 4, the strut member 20 integrally includes a strut body 21, the base-end-side flange 22, and a distal-end-side flange 23.

As illustrated in FIGS. 2 and 3, the base-end-side flange 22 of the strut member 20 is formed to extend toward the outer side in the vehicle width direction from a base end (rear end) of the strut body 21. The base-end-side flange 22 includes a plurality of (two) mounting holes 22a passing through in the vehicle front-rear direction at positions corresponding to the mounting holes 110c of the mounting plate 110 in a front view (view in the vehicle front-rear direction).

The base-end-side flange 22 of the strut member 20 is connected to a front surface of the mounting plate 110 by using a fastening member Tc including a bolt and a nut. Specifically, the base-end-side flange 22 is abutted against a front surface of the mounting plate 110, and in this state, a bolt is received in the mounting hole 22a of the base-end-side flange 22 and in the mounting hole 110c of the mounting plate 110, and a nut is screwed with the bolt. Thus, the base-end-side flange 22 of the strut member 20 is connected to the mounting plate 110.

As illustrated in FIGS. 1 to 3, the distal-end-side flange 23 of the strut member 20 is formed to extend toward the outer side in the vehicle width direction from a distal end (front end) of the strut body 21.

As illustrated in FIGS. 2 and 3, the distal-end-side flange 23 of the strut member 20 includes a plurality of (two) mounting holes 23a passing through in the vehicle front-rear direction at positions corresponding to the mounting holes 14a of the distal-end-side flange 14 of the frame member 10 in a front view (view in the vehicle front-rear direction).

The distal-end-side flange 23 of the strut member 20 is connected to the rear wall 121 of the bumper reinforcement 120 together with the distal-end-side flange 14 of the frame member 10 by using a fastening member Td including a bolt and a nut. Specifically, the distal-end-side flange 14 of the frame member 10 is disposed to be interposed between the distal-end-side flange 23 of the strut member 20 and the rear wall 121 of the bumper reinforcement 120, and in this state, a bolt is received in the mounting hole 23a of the distal-end-side flange 23, in the mounting hole 14a of the distal-end-side flange 14, and in the mounting hole 120a of the rear wall 121, and a nut is screwed with the bolt. Thus, the distal-end-side flanges 23 and 14 of the strut member 20 and the frame member 10 (in other words, a distal end of the crash can 1) are connected to the rear wall 121 of the bumper reinforcement 120.

As illustrated in FIGS. 1, 2, and 4, the strut body 21 is disposed to extend in the vehicle front-rear direction substantially over the entire length from the rear wall 121 of the bumper reinforcement 120 to a front surface of the mounting plate 110 at a position corresponding to the opening portion 15 of the frame member 10 on the outer side in the vehicle width direction. Further, the strut body 21 is disposed in such a way that gaps Su and Sd are respectively formed between the strut body 21 and each of the upper and lower opening edges 15u and 15d.

Specifically, as illustrated in FIG. 4, the gap Su (upper gap Su) is formed between an upper end 21u of the strut body 21 and the upper opening edge 15u, and the gap Sd (lower gap Sd) is formed between a lower end 21d of the strut body 21 and the lower opening edge 15d in a state that the strut body 21 is disposed in the opening portion 15 (between the upper and lower opening edges 15u and 15d) of the frame member 10.

Vertical widths of the upper gap Su and the lower gap Sd are set to a value capable of interfering and supporting the opening edges 15u and 15d of the frame member 10 by the strut member 20 at a time of oblique collision from upward or oblique collision from downward. Specifically, when an upward or downward bending stress acts on the frame member 10 by oblique collision from upward or oblique collision from downward, the frame member 10 is deformed in a direction to move the upper and lower opening edges 15u and 15d toward each other. At this occasion, as far as the vertical widths of the upper gap Su and the lower gap Sd lie within a predetermined range, the upper opening edge 15u is abutted against the upper end 21u of the strut body 21, and the lower opening edge 15d is abutted against the lower end 21d of the strut body 21. The vertical widths of the upper gap Su and the lower gap Sd are set to a value capable of performing support (interference and support) by the abutment. Setting the gaps Su an Sd as described above contributes to suppressing the frame member 10 from being excessively deformed at a time of oblique collision from upward or oblique collision from downward.

Further, the vertical widths of the upper gap Su and the lower gap Sd are set to a value capable of discharging, to the outside, fragments of the frame member 10, which is sequentially destroyed at a time of vehicle collision. Sequential destruction indicates a deformation mode at which an object is compressed and destroyed in an order from a side where a load is input (in this case, in an order from the front side).

The upper gap Su and the lower gap Sd are formed to have a substantially fixed vertical width along the vehicle front-rear direction. Specifically, as illustrated in FIG. 2, the strut body 21 is formed into a trapezoidal shape in a vehicle side view in association with a tapered shape of the opening portion 15 whose vertical width is gradually decreased toward the front side.

As illustrated in FIGS. 1 to 4, the strut body 21 includes a plurality of base wall portions 25, and a plurality of convex portions 26 protruding in a direction (toward the outer side in the vehicle width direction) away from the frame member 10 with respect to the base wall portions 25. The plurality of the base wall portions 25 and the plurality of the convex portions 26 are alternately arranged to align at a predetermined pitch (equi-distantly) in the vehicle front-rear direction. In the present embodiment, eight convex portions 26 in total are formed on the strut body 21.

The base wall portions 25 and the convex portions 26 are respectively formed to extend in the up-down direction from the upper end 21u to the lower end 21d of the strut body 21.

The strut body 21 is formed to have a substantially fixed plate thickness from a front end to a rear end thereof. However, the strut body 21 is formed into a corrugated shape including the plurality of the convex portions 26 as described above. Therefore, as compared with a case that, for example, the strut body 21 is formed into a flat plate linearly extending in the vehicle front-rear direction, an interfering support force (force against a compression stress) of the strut body 21 in the up-down direction is high.

As described above, the crash can 1 according to the present embodiment includes the frame member 10 of carbon fiber reinforced resin (CFRP) extending in the vehicle front-rear direction and having the opening portion 15 in a surface thereof on the outer side in the vehicle width direction; and the strut member 20 disposed in the opening portion 15 of the frame member 10. The frame member 10 includes the frame body 11 having the opening portion 15, and the upper rib 12u and the lower rib 12d protruding upward and downward from the frame body 11 and extending in the vehicle front-rear direction. The strut member 20 is disposed between the paired opening edges 15u and 15d for defining an upper edge and a lower edge of the opening portion 15, and at a position abuttable against the paired opening edges 15u and 15d, when the frame member 10 is deformed by input of a load at a time of oblique collision from upward or oblique collision from downward (see FIGS. 1, 2, and 4).

In this configuration, a unit having an opened cross sectional structure including the opening portion 15 is used as the resin frame member 10. Therefore, it is more easy to form the frame member 10 of a resin material, as compared with a case that the frame member 10 has a closed cross sectional structure. However, it is conceived that rigidity of the frame member 10 having an opened cross sectional structure is weak against a bending stress, and the frame member 10 is likely to be bent and deformed at a time of oblique collision from upward or oblique collision from downward. In contrast, in the embodiment, the strut member 20 is disposed in the opening portion 15 of the frame member 10. Therefore, the strut member 20 is abutted against the upper and lower opening edges 15u and 15d, when the frame member 10 is deformed by input of a load at a time of oblique collision from upward or oblique collision from downward. Consequently, a deformation amount of the frame member 10 is kept low. Specifically, even when the frame member 10 is attempted to be deformed to narrow the opening portion 15 (in other words, move the upper and lower opening edges 15u and 15d toward each other), a deformation amount of the frame member 10 is restricted by abutment of the upper and lower opening edges 15u and 15d against the strut member 20. This contributes to suppressing upward and downward bending deformation of the frame member 10. Further, since the frame member 10 includes the ribs 12u and 12d extending in the vehicle front-rear direction, bending deformation of the frame member 10 is also suppressed by action of the ribs 12u and 12d. Thus, the embodiment is able to advantageously suppress bending of an intermediate portion of the crash can 1 in the front-rear direction due to a bending stress acting at a time of oblique collision from upward or oblique collision from downward, while making it easy to produce the crash can 1 including the frame member 10 and the strut member 20.

Further, in the embodiment, the gap Su is formed along the vehicle front-rear direction and between the upper opening edge 15u and the upper end 21u of the strut member 20, and the gap Sd is formed along the vehicle front-rear direction and between the lower opening edge 15d and the lower end 21d of the strut member 20 (see FIGS. 1, 2, and 4).

In this configuration, since fragments of the frame member 10, which is sequentially destroyed at a time of vehicle collision, are discharged to the outside through the upper and lower gaps Su and Sd, it is possible to prevent the fragments from being accumulated in the opened cross sectional space 11A inside the frame member 10. Thus, sequential destruction of the frame member 10 is smoothly carried out, particularly at a time of frontal collision of the vehicle (at a time of collision in which an input direction of a collision load substantially coincides with the vehicle front-rear direction). This enables to sufficiently secure a destructive amount of the frame member 10 in a compression direction.

In other words, the above configuration enables to appropriately and sequentially destroy the frame member 10 at a time of frontal collision, while suppressing bending of an intermediate portion of the frame member 10 in the front-rear direction due to a bending stress acting at a time of oblique collision from upward or oblique collision from downward. This enables to enhance impact absorbing ability by the frame member 10.

Further, in the embodiment, the strut member 20 includes the plurality of the base wall portions 25 extending in the up-down direction, and the plurality of the convex portions 26 protruding toward the outer side in the vehicle width direction (in a direction away from the frame member 10) from the base wall portions 25 and extending in the up-down direction. The plurality of the base wall portions 25 and the plurality of the convex portions 26 are alternately arranged to align in the vehicle front-rear direction at a predetermined pitch (see FIGS. 1 to 3).

In this configuration, since the plurality of the convex portions 26 protruding toward the outer side in the vehicle width direction and extending in the up-down direction are formed on the strut member 20, it is possible to enhance rigidity of the strut member 20 against an upward or downward load, as compared with a case that the strut member 20 is formed of a simple flat plate. Therefore, it is possible to securely receive, by the strut member 20, the upper and lower opening edges 15u and 15d of the frame member 10 at a time of oblique collision from upward or oblique collision from downward, and it is possible to advantageously suppress bending deformation of the frame member 10.

On the other hand, since the strut member 20 includes a plurality of ridgelines formed on boundaries between the convex portions 26 and the base wall portions 25, and extending in the up-down direction, the ridgelines function to induce bending at a time of frontal collision. Thus, since compressive destruction of the strut member 20 is promoted, it is possible to appropriately and sequentially destroy the crash can 1 including the strut member 20 and the frame member 10, and further enhance impact absorbing ability by the cash can 1.

Further, in the embodiment, the strut member 20 includes the base-end-side flange 22 connected to the front side frame 100 via the mounting plate 110, and the distal-end-side flange 23 directly connected to the bumper reinforcement 120 (see FIGS. 1 to 3).

In this configuration, it is possible to appropriately and sequentially destroy the strut member 20 in an order from the front side by a collision load input from the bumper reinforcement 120 through the distal-end-side flange 23 at a time of vehicle collision, and efficiently transmit the collision load input to the strut member 20 to the front side frame 100 through the base-end-side flange 22.

The present invention is not limited to a configuration of the embodiment, and various modifications are available, as far as the modifications do not depart from the gist of the present invention.

For example, the embodiment employs, as the strut member 20, the corrugated strut member 20, which is formed in such a way that the plurality of base wall portions 25 and the plurality of the convex portions 26 are alternately aligned in the vehicle front-rear direction. However, the shape of the strut member 20 is not limited to the above. For example, it is possible to employ a strut member, which is formed in such a way that a thick portion having a large thickness in the vehicle width direction, and a thin portion having a small thickness in the vehicle width direction are alternately aligned in the vehicle front-rear direction.

In the embodiment, both of the frame member 10 and the strut member 20 are formed of carbon fiber reinforced resin (CFRP). Alternatively, another resin material may be used as a material for the frame member and the strut member. Further, the strut member is not necessarily required to be formed of a resin material. The strut member may be formed of a material other than the resin material, such as a steel plate.

In the embodiment, the upper rib 2u protruding upward, and the lower rib 12d are formed on the frame member 10. Alternatively, one of the upper rib 12u and the lower rib 12d may be omitted.

In the embodiment, the upper gap Su is formed between the upper opening edge 15u of the frame member 10 and the upper end 21u of the strut member 20, and the lower gap Sd is formed between the lower opening edge 15d of the frame member 10 and the lower end 21d of the strut member 20. Alternatively, one of the upper gap Su and the lower gap Sd may be omitted.

Overview of Embodiment

The following is an overview of the embodiment.

An impact absorbing structure for a vehicle according to the embodiment includes: a resin frame member extending in a vehicle front-rear direction and including an opening portion in a surface thereof on one side in a vehicle width direction; and a strut member disposed in the opening portion of the frame member. The frame member includes a frame body having the opening portion, and a rib protruding at least either upward or downward from the frame body and extending in the vehicle front-rear direction. The strut member is disposed between a pair of opening edges for defining an upper edge and a lower edge of the opening portion, and at a position abuttable against the paired opening edges, when the frame member is deformed by input of a load at a time of oblique collision from upward or oblique collision from downward.

In the above configuration, since a unit having an opened cross sectional structure including the opening portion is used as the resin frame member. Therefore, it is more easy to form the frame member of a resin material, as compared with a case that the frame member has a closed cross sectional structure. However, it is conceived that rigidity of the frame member having an opened cross sectional structure is weak against a bending stress, and the frame member is likely to be bent and deformed at a time of oblique collision from upward or oblique collision from downward. In contrast, in the above configuration, the strut member is disposed in the opening portion of the frame member. Therefore, the strut member is abutted against the upper and lower opening edges, when the frame member is deformed by input of a load at a time of oblique collision from upward or oblique collision from downward. Consequently, a deformation amount of the frame member is kept low. Specifically, even when the frame member is attempted to be deformed to narrow the opening portion (in other words, move the upper and lower opening edges toward each other), a deformation amount of the frame member is restricted by abutment of the upper and lower opening edges against the strut member. This contributes to suppressing upward and downward bending deformation of the frame member. Further, since the frame member includes the ribs extending in the vehicle front-rear direction, bending deformation of the frame member is also suppressed by action of the ribs. Thus, the above configuration is able to advantageously suppress bending of an intermediate portion of a buffer member (crash can) in the front-rear direction due to a bending stress acting at a time of oblique collision from upward or oblique collision from downward, while making it easy to produce the buffer member including the frame member and the strut member.

Preferably, a gap may be formed along the vehicle front-rear direction and in at least one of positions between the upper opening edge and an upper end of the strut member, and between the lower opening edge and a lower end of the strut member.

In the above configuration, since fragments of the frame member, which is sequentially destroyed at a time of vehicle collision, are discharged to the outside through the gaps, it is possible to prevent the fragments from being accumulated inside the frame member. Thus, sequential destruction of the frame member is smoothly carried out, particularly at a time of frontal collision of the vehicle (at a time of collision in which an input direction of a collision load substantially coincides with the vehicle front-rear direction). This enables to sufficiently secure a destructive amount of the frame member in a compression direction.

In other words, in the above configuration, it is possible to appropriately and sequentially destroy the frame member at a time of frontal collision, while suppressing bending of an intermediate portion of the frame member in the front-rear direction due to a bending stress acting at a time of oblique collision from upward or oblique collision from downward, and enhance impact absorbing ability by the frame member.

Preferably, the strut member may include a plurality of base wall portions extending in an up-down direction, and a plurality of convex portions protruding toward one side in the vehicle width direction from the base wall portions and extending in the up-down direction. The plurality of the base wall portions and the plurality of the convex portions may be alternately arranged to align in the vehicle front-rear direction.

In the above configuration, since the plurality of the convex portions protruding toward one side in the vehicle width direction and extending in the up-down direction are formed on the strut member, it is possible to enhance rigidity of the strut member against an upward or downward load, as compared with a case that the strut member is formed of a simple flat plate. Therefore, it is possible to securely receive, by the strut member, the upper and lower opening edges of the frame member at a time of oblique collision from upward or oblique collision from downward, and it is possible to advantageously suppress bending deformation of the frame member.

On the other hand, since the strut member includes a plurality of ridgelines formed on boundaries between the convex portions and the base wall portions, and extending in the up-down direction, the ridgelines function to induce bending at a time of frontal collision. Thus, since compressive destruction of the strut member is promoted, it is possible to appropriately and sequentially destroy a buffer member (crash can) including the strut member and the frame member, and further enhance impact absorbing ability by the buffer member.

The frame member and the strut member may be disposed between a front side frame and a bumper reinforcement on a front portion of the vehicle.

In the above configuration, it is possible to suppress bending deformation of the frame member at a time of oblique collision from upward or oblique collision from downward, while reducing the weight of the front portion of the vehicle.

In the above configuration, more preferably, the strut member may include a base-end-side flange connected to the front side frame, and a distal-end-side flange connected to the bumper reinforcement.

In the above configuration, it is possible to appropriately and sequentially destroy the strut member in an order from the front side by a collision load input from the bumper reinforcement through the distal-end-side flange at a time of vehicle collision, and efficiently transmit the collision load input to the strut member to the front side frame through the base-end-side flange.

The invention claimed is:

1. An impact absorbing structure for a vehicle comprising:
   a resin frame member extending in a vehicle front-rear direction and including an opening portion in a surface thereof on one side in a vehicle width direction; and
   a strut member disposed in the opening portion of the frame member, wherein
   the frame member includes a frame body having the opening portion, and a rib protruding at least either upward or downward from the frame body and extending in the vehicle front-rear direction,
   the strut member is disposed between a pair of opening edges for defining an upper edge and a lower edge of the opening portion, and at a position abuttable against the paired opening edges, when the frame member is deformed by input of a load at a time of oblique collision from upward or oblique collision from downward, and
   a gap is formed along the vehicle front-rear direction and in at least one of positions between the upper opening edge and an upper end of the strut member, and between the lower opening edge and a lower end of the strut member.

2. The impact absorbing structure for the vehicle according to claim 1, wherein
   the strut member includes a plurality of base wall portions extending in an up-down direction, and a plurality of convex portions protruding toward one side in the vehicle width direction from the base wall portions and extending in the up-down direction, and
   the plurality of the base wall portions and the plurality of the convex portions are alternately arranged to align in the vehicle front-rear direction.

3. The impact absorbing structure for the vehicle according to claim 2, wherein the frame member and the strut member are disposed between a front side frame and a bumper reinforcement on a front portion of the vehicle.

4. The impact absorbing structure for the vehicle according to claim 3, wherein
the strut member includes a base-end-side flange connected to the front side frame, and a distal-end-side flange connected to the bumper reinforcement.

5. The impact absorbing structure for the vehicle according to claim 1, wherein
the frame member and the strut member are disposed between a front side frame and a bumper reinforcement on a front portion of the vehicle.

6. The impact absorbing structure for the vehicle according to claim 5, wherein
the strut member includes a base-end-side flange connected to the front side frame, and a distal-end-side flange connected to the bumper reinforcement.

7. An impact absorbing structure for a vehicle comprising:
a resin frame member extending in a vehicle front-rear direction and including an opening portion in a surface thereof on one side in a vehicle width direction; and
a strut member disposed in the opening portion of the frame member, wherein
the frame member includes a frame body having the opening portion, and a rib protruding at least either upward or downward from the frame body and extending in the vehicle front-rear direction,
the strut member is disposed between a pair of opening edges for defining an upper edge and a lower edge of the opening portion, and at a position abuttable against the paired opening edges, when the frame member is deformed by input of a load at a time of oblique collision from upward or oblique collision from downward,
the strut member includes a plurality of base wall portions extending in an up-down direction, and a plurality of convex portions protruding toward one side in the vehicle width direction from the base wall portions and extending in the up-down direction, and
the plurality of the base wall portions and the plurality of the convex portions are alternately arranged to align in the vehicle front-rear direction.

8. The impact absorbing structure for the vehicle according to claim 7, wherein
the frame member and the strut member are disposed between a front side frame and a bumper reinforcement on a front portion of the vehicle.

9. The impact absorbing structure for the vehicle according to claim 8, wherein
the strut member includes a base-end-side flange connected to the front side frame, and a distal-end-side flange connected to the bumper reinforcement.

* * * * *